W. R. CLARK.
METAL COILING APPARATUS.
APPLICATION FILED AUG. 29, 1914.
1,258,092.
Patented Mar. 5, 1918.
5 SHEETS—SHEET 2.
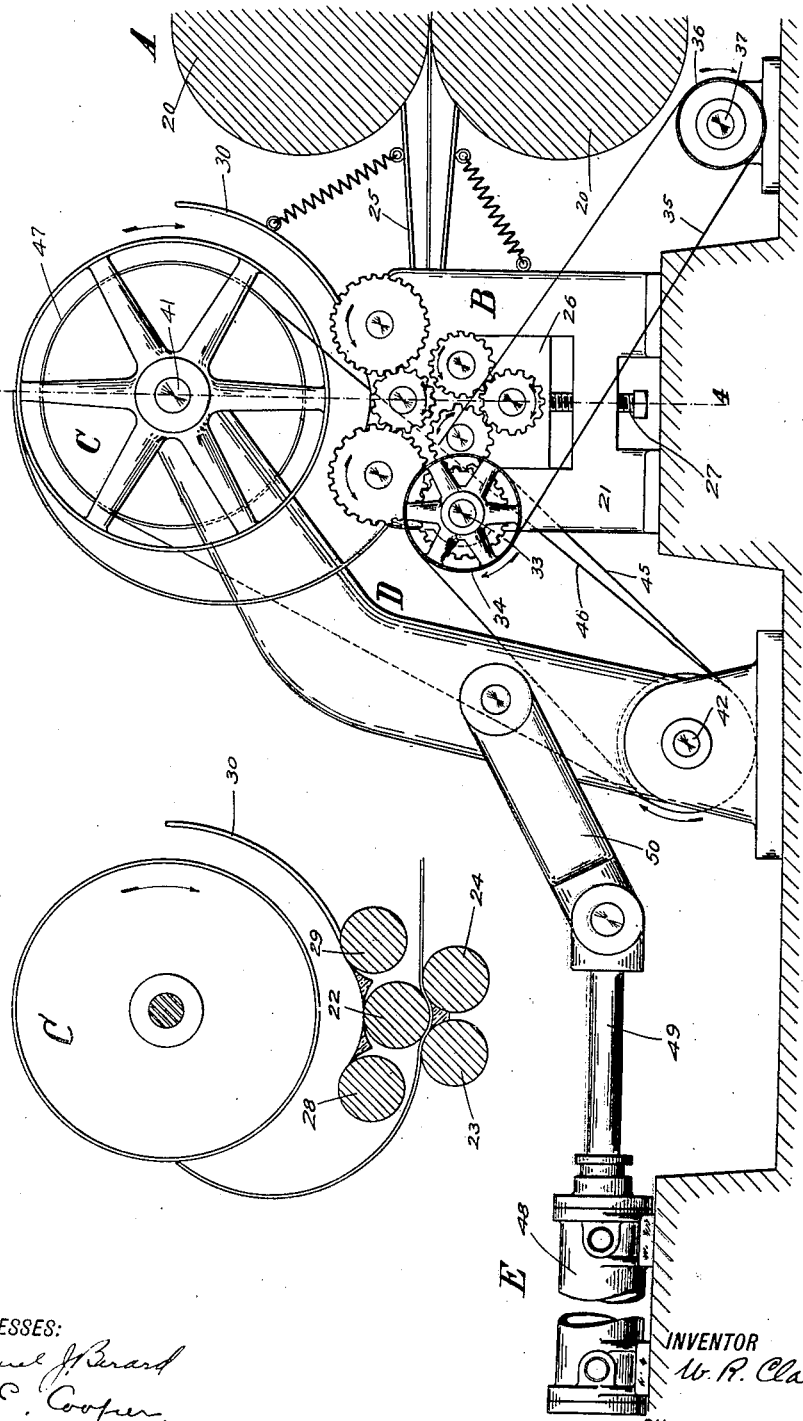
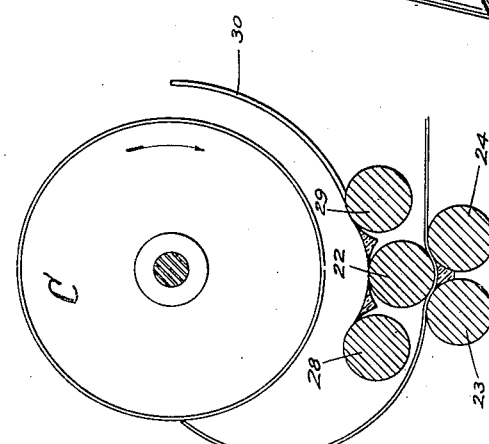
WITNESSES:
INVENTOR
W. R. Clark
BY
ATTORNEY W. R. CLARK.
METAL COILING APPARATUS.
APPLICATION FILED AUG. 29, 1914.
1,258,092.
Patented Mar. 5, 1918.
5 SHEETS—SHEET 3.
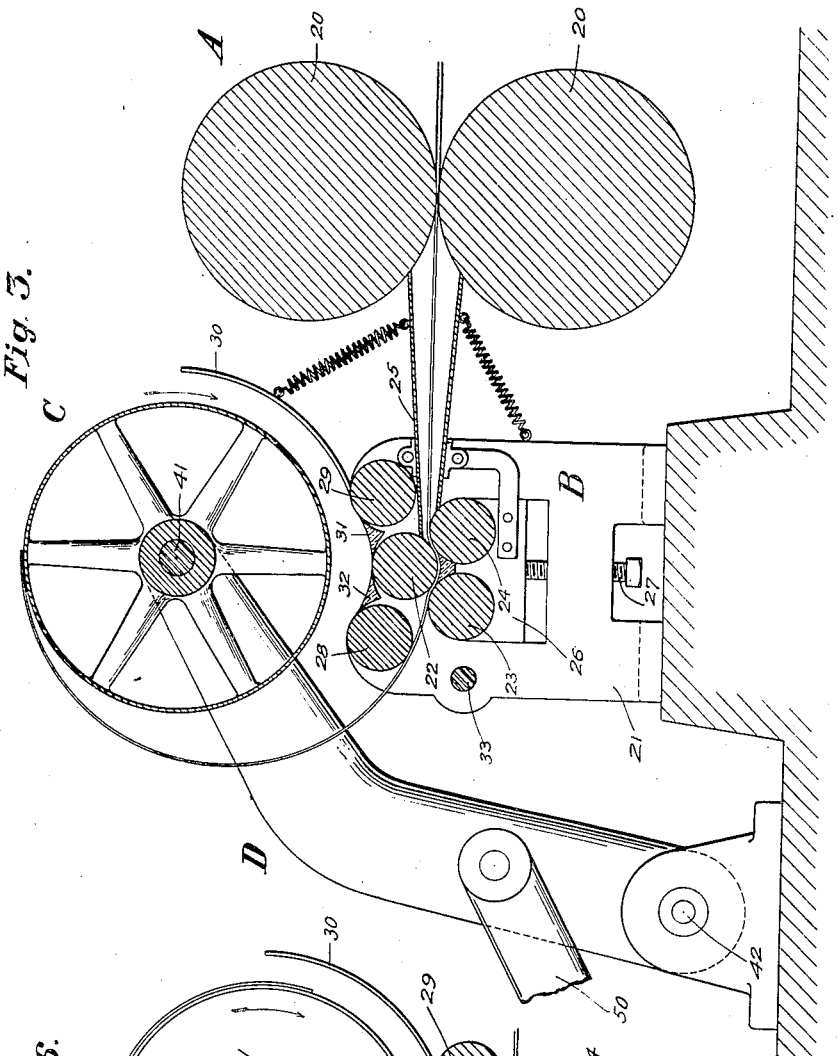
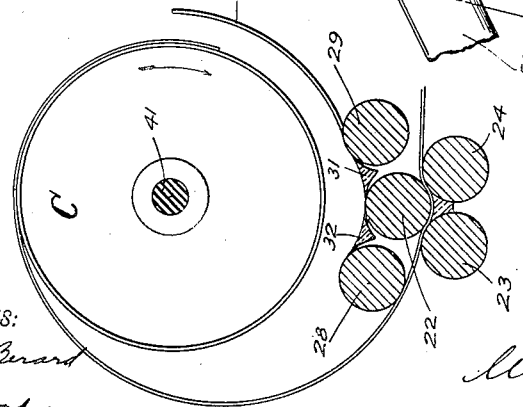

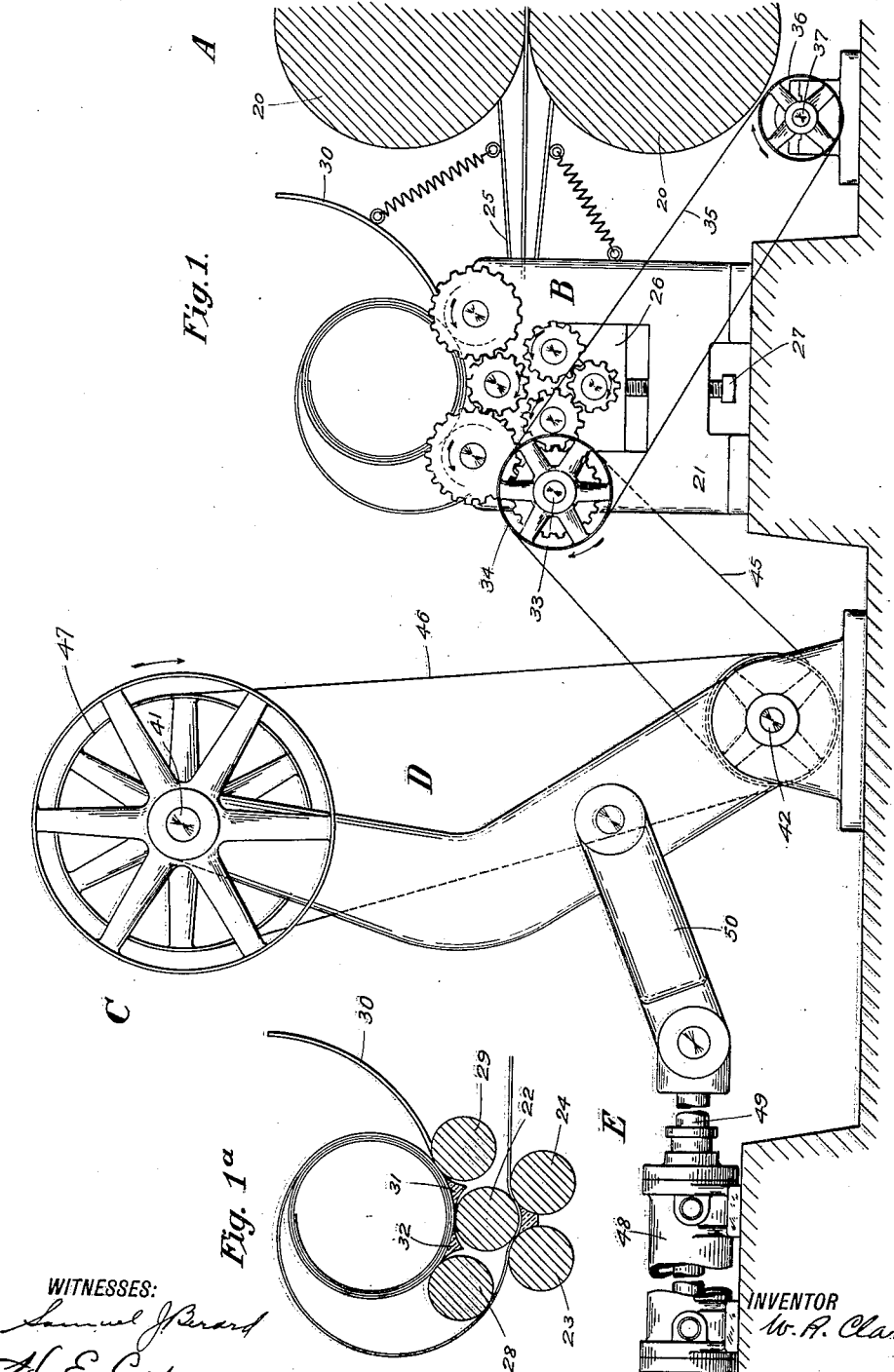

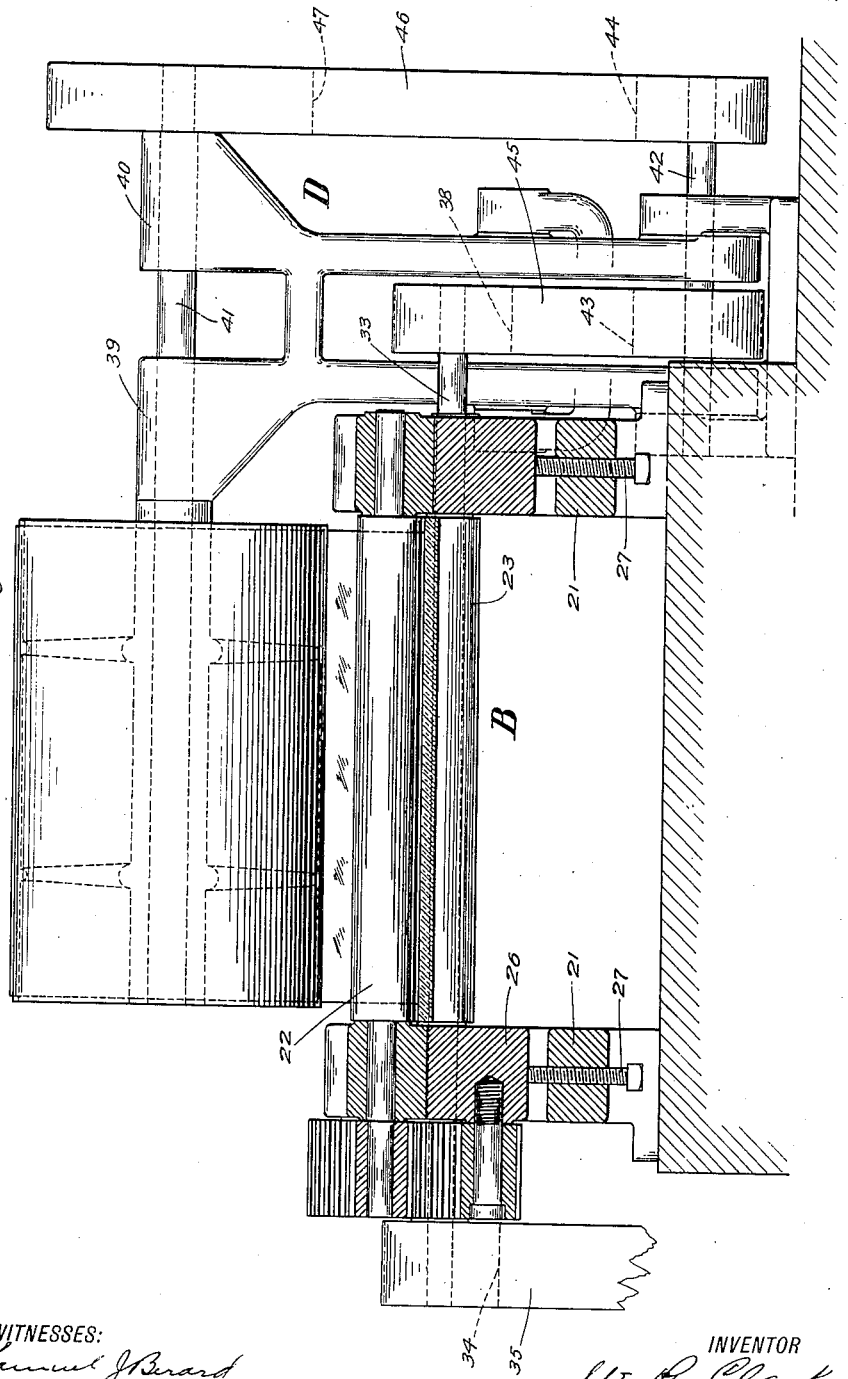

W. R. CLARK.
METAL COILING APPARATUS.
APPLICATION FILED AUG. 29, 1914.
1,258,092.
Patented Mar. 5, 1918.
5 SHEETS—SHEET 5.
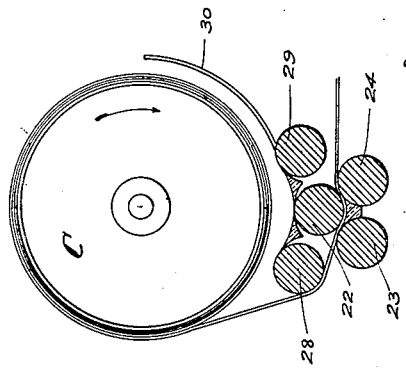
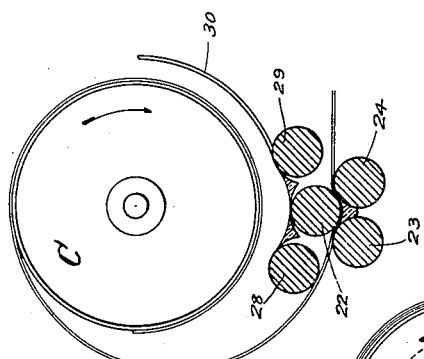
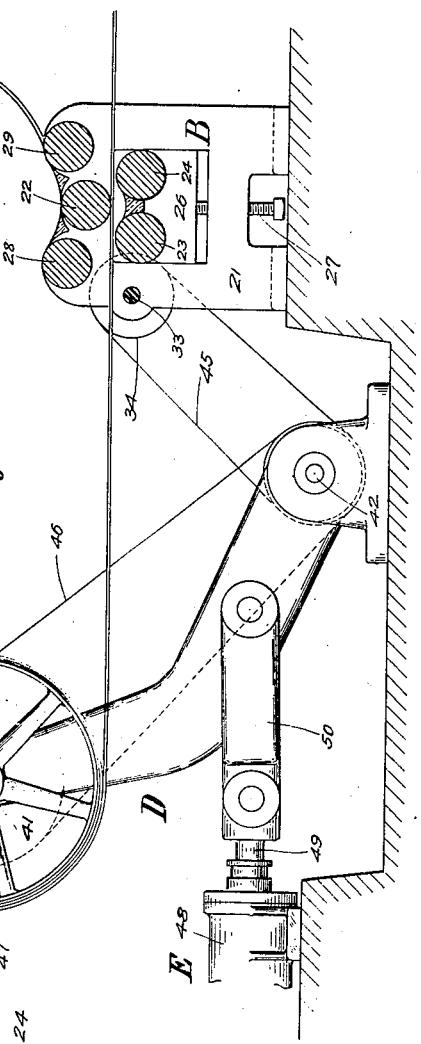
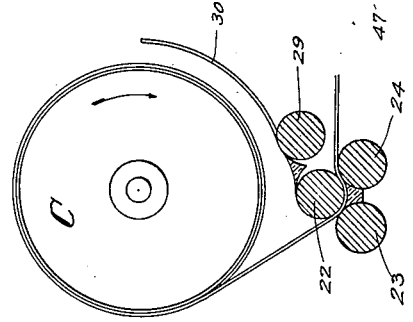
WITNESSES:
INVENTOR
ATTORNEY

UNITED STATES PATENT OFFICE.

WALTER R. CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METAL-COILING APPARATUS.

1,258,092.  Specification of Letters Patent.  Patented Mar. 5, 1918.

Application filed August 29, 1914. Serial No. 859,237.

*To all whom it may concern:*

Be it known that I, WALTER R. CLARK, a citizen of the United States, residing in the city of Bridgeport, county of Fairfield, and State of Connecticut, have invented certain new and useful Improvements in Metal-Coiling Apparatus, of which the following is a full, clear, and exact description.

In the use of reels, drums or so-called "blocks" for coiling sheet or strip metal as delivered from various machines such as rolling mills, cleaning machines, slitters, etc., it is desirable to feed the metal onto the block in a convenient and safe manner without stopping the machine or the block and without danger to the operator. The ordinary manual blocking or coiling at rather slow speeds, where the end of the strip, sheet or other length of stock is bent by hand and thus started around the rotating block, is not particularly dangerous to the operator, but where the strip is fed at a high speed considerable skill is necessary to manually start the the strip around the block, and moreover, the operation is accompanied with considerable hazard. There are certain machines in use wherein a device in the nature of a removable envelop is placed around the block to automatically guide the strip, but such machines are quite complicated and expensive, and furthermore, the fact that the envelop must be released and removed or opened before the coil can be removed, and in most cases, before the strip has wound many times around the block, causes considerable loss of time and detracts from their usefulneses. One of the primary objects of the present invention, therefore, is to provide a simple, efficient form of metal coiling apparatus for coiling a strip or other length of stock, issuing from a rolling mill or other machine, on a winding drum or block in a safe and expeditious manner.

In many instances a block or drum is not necessary at all to coil the material, as this can be done by an ordinary three-roll coiler such as is familiar to those versed in the art. The three-roll coiler, or an equivalent device, will crimp or set the metal strip so that it will coil on itself in successive convolutions as the metal continues to issue from the rolling mill or other machine. When this operation is carried out there is no necessity for a mandrel, core, drum, block or similar part to serve as a support for the coil, which, as it forms, may be supported from beneath by means of suitable rollers or the like. In other cases, however, it is desired to exert considerable tension upon the metal being coiled, e. g. to insure its feeding evenly and flatly from the rolls of a rolling mill, or to assist in feeding through the knives of a slitter. In this case it has been impossible to utilize the three-roll coiler, and the use of a block has generally been necessitated, the required tension being created by driving the block at a speed faster than the strip is fed to it, the driving means being constituted by a belt or friction clutch or other means which can slip when loaded beyond the pull for which it is set. There are, therefore, certain times when a coiler can be used advantageously, and there are other occasions where it is desirable to use a block or reel.

One of the objects of the present invention is to meet the above described conditions by providing a machine which can be used at will either for coiling the stock without the use of a block or with the use of a block. Viewed in one light the object is to provide any preferred form of coiler for coiling the strip without the use of a block, with means for converting it into a so-called blocker, having provision for winding the strip on a block, drum or reel. Viewed in another aspect the object is to furnish a blocker of such construction that it can, if desired, be employed as a means for forming an open coil devoid of tension, e. g. as an ordinary three-roll coiler.

Another object of the invention is to improve the general construction and operation of apparatus of the class to which the invention relates.

To these and other ends, the invention consists in the novel features and combinations of parts to be hereinafter described and claimed.

The accompanying drawings illustrate a preferred form of apparatus embodying my invention, but the invention can be embodied in a number of other forms without digressing from my inventive conception or idea as hereinafter set forth.

In the drawings

Figure 1 is a side elevation, partly in section, of a rolling mill installation having my improvements, showing the coiling apparatus in the process of forming an open coil, that is, of forming a coil without the use of a drum or block;

Fig. 1ª is a diagrammatic detail of Fig. 1, showing more clearly the position of the strip, at an intermediate stage in the operation;

Fig. 2 is a view similar to Fig. 1, showing the drum or block in operative position with the strip in a preliminary stage of the blocking operation;

Fig. 3 is a vertical, longitudinal section of the apparatus in the position shown in Fig. 2;

Fig. 4 is an end elevation of the coiling apparatus, partly in section on line 4—4 of Fig. 2;

Figs. 5-9, inclusive, are diagrams showing successive stages of the operation of coiling the strip on the block; and Fig. 10 is a diagrammatic view showing a slightly modified construction.

Referring to the drawings, I have shown my improvements applied to an apparatus for coiling strip metal as it is delivered from the rolls of a rolling mill A. I have not deemed it necessary to illustrate the entire roll stand and have shown the rolls diagrammatically, as indicated by reference character 20. On the discharge side of the rolls 20 is a device for forming an open coil, illustrated as an ordinary three-roll coiler. This three-roll coiler is designated generally by reference character B. Movable into and out of coöperation with the coiler B is a block, drum or reel C, mounted on a suitable carrier D, adapted to be actuated by power mechanism E. By operating the carrier D by means of the power mechanism E the block or drum C may be moved into or out of coöperation with the coiler B for the purposes hereinafter described.

Referring now to the details of the apparatus, the coiler B may, as stated, be of the usual three-roll type, having side frames 21 between which are mounted three rolls 22, 23 and 24 respectively, which give the metal issuing from the reducing rolls 20 a bend or set which causes successive convolutions to coil on each other, in the well known manner. The metal strip passes from the bite of the reducing rolls 20 directly into the bite of the coiling rolls 22, 23, 24, by way of a guide 25, which may be of any preferred construction. In the form shown the bend or set given to the metal may be varied by adjustment of the lower coiling rolls 23, 24, relative to the upper coiling roll 22, for which purpose the rolls 23, 24 have bearing blocks 26, common to both, which in the embodiment illustrated are vertically adjustable by means of screws 27. However, it will be understood that the same result could be obtained by vertical adjustment of the roll 22 relative to the rolls 23, 24, and that in fact the rolls 22, 23, 24 can be adjustable in various ways individually and relative to each other, as called for by circumstances, without departing in any way from the invention. Suitable power mechanism for adjusting the coiling rolls to vary the bend or set given the metal may be employed, and it will be manifest that I have shown the adjusting screws 27 merely for the purpose of simplifying the disclosure. In the form shown the coiling rolls give the metal a set in an upward direction, so that the axis of the coil which is formed is above the coiling rolls, and as the coil forms it is supported on the upper surfaces of supporting rollers 28 and 29, located on opposite sides respectively of the roll 22, as shown in Fig. 1ª. The rolls 28 and 29 not only support the metal but by their movement facilitate the coiling thereof, and in order to still further facilitate the formation of the coil, a guide plate 30 is located at the rear of the coiler B in association with the roll 29, and suitable guard devices 31, 32 are interposed respectively between the rolls 22 and 29 and between the rolls 22 and 28, as shown in Fig. 1ª. The various rolls of the coiler B are driven by suitable gears, which are illustrated in the drawings, but which it will not be necessary to refer to in detail. In the form shown the driving power is applied to a shaft 33 appropriately journaled in the side frames 21. This shaft carries a pulley 34 and may be driven by a belt 35 running over said pulley and over a pulley 36 on a line shaft 37, although the particular driving means is unessential.

In the machine illustrated the pulley 34 for driving the coiler rolls is located at the same side of the coiler as the various driving gears, as shown more particularly in Fig. 4. On the opposite end of the shaft 33, that is, at the opposite side of the coiler, said shaft carries a pulley 38. The pulley 38 is instrumental in driving the rotary block or drum C, as will now be described.

The block or drum C is movably mounted so that it may be shifted to a position wherein its axis is above and substantially in vertical alinement with the axis of the coiling roll 22, in such a location that the coil formed by the rolls 22, 23, 24 will wrap or wind around the block. In other words, the block and coiler are so arranged that one is movable relatively to the other in a plane at right angles to the axis of the block. In the form shown the carrier D consists of a pivoted lever or frame supporting the block C for movement into and out of the position just indicated. The upper end portion of the lever or frame D is provided with bearings 39, 40 for the shaft 41 of the block, and the lower end of said lever or frame is pivoted to a suitable support in such a manner that the lever frame can swing in a vertical plane to carry the block into coöperation with the coiler, as shown in Fig. 2, or out of coöperation with the coiler, as shown in Figs. 1 and 9. In the example illustrated the lower extremity of the lever or frame D is pivoted on a shaft 42, which shaft 42 also aids in the rotation of the block. To this end the pivot shaft 42 carries pulleys 43, 44, respectively, the first of which is driven by a belt 45, running over the pulley 38 on the drive shaft of the coiler B, while the second pulley (44) drives a belt 46, running over a pulley 47 on the block shaft 41.

The power mechanism E for actuating the frame or lever D and thereby swinging the block into and out of position above the coiler may be a hydraulic or other fluid pressure device such as a cylinder 48 the piston of which (not shown) is connected by a connecting rod 49 and link 50 with the lower portion of the block carrying frame. Provision is made for driving the piston of the device 48 in either direction. When the piston is thrust to the right (Fig. 2) the frame D is swung to carry the block into position over the coiler B, and when the piston is driven toward the left (Fig. 2) the block is swung upward away from the coiler, as shown in Fig. 1, and on further movement the parts will take the position shown in Fig. 9.

The operation of the apparatus is substantially as follows: when it is desired to coil the strip in an open coil, without subjecting it to tension, the power mechanism E is actuated to move the block C laterally to some distance from the coiler B, and the strip emerging from the rolling mill is formed into a coil on the rolls 28, 29, as previously explained. In this case either of the driving belts 45 or 46 may be rendered inoperative if desired as the rotation of the block is unnecessary.

When it is desired to coil the strip on the block for the purpose of creating tension in the strip, the power mechanism E is actuated to move the block into position over the coiler B, as shown in Figs. 2 and 3. In this position the block is in substantial vertical alinement with the coiling roll 22 and the lower portion of the block is spaced a certain distance from the upper surfaces of the rolls 28, 22, 29.

By comparing Figs. 1 and 2 it will be seen that in this position of the parts the block is somewhat out of axial coincidence with the coil which would normally be formed by the coiler B. In the form shown the axis of the block is somewhat above what might be termed the normal axis of the coil. The block is rotated by its belt 46 and it will be noted that the mechanism is so arranged that the surface speed of the block is greater than that of the coiling rolls. Furthermore, the mechanism is so adjusted that the coiling rolls bend the strip to such an extent that the latter tends to form a circle which is slightly smaller than the circumference of the winding drum or block C. The metal passing out of the rolls 20 and through the coiling rolls is bent into an upwardly directed curve as before, and the end portion of the strip forms a curve of less radius than the drum or block, but the forward extremity strikes the periphery of the drum, say, approximately in horizontal alinement with its axis, as shown in Fig. 5, so that the coil or curve is expanded. As the strip continues to feed upwardly around the rotating block the free extremity of the strip hugs the block closely, as shown in Figs. 6 and 7, and finally the extremity of the strip, after hugging the block through a rotation of,—say, approximately 450 degrees,—passes into contact with the under surface of another portion of the strip fed upward from the coiling rolls. At this instant a layer of the strip is in close contact with the block throughout the circumference or periphery of the latter. When the forward extremity of the strip comes into contact with and is confined by what might be termed the second layer of the coil the first layer is frictionally clamped on the block, and as the latter rotates at a higher surface speed than the strip, it exerts a frictional pull upon the strip, which pulls it tight and exerts tension upon it in proportion to the tightness of the driving belt. As the rotation of the block and the feed of the strip continue further layers of successively increasing diameter are laid on the block in such a manner as to form a tight uniform coil thereon, with the proper tension in that portion of the strip intermediate the block and the rolling mill or other machine. By comparing Figs. 7 and 8 it will be seen how the increased surface speed of the block relative to the normal feed of the strip causes the strip to be pulled up in a straight line from the roll 28, instead of in a gradual curve, after the first layer has been formed. After a few convolutions have been laid on the block the strip can be given a straight pull from the rolls or other machine if desired by actuating the power mechanism E to shift the block into the position shown in Fig. 9. The coiling rolls 22, 23, 24 may be adjusted to release the strip when the block is in this position, so that during the greater part of the formation of the coil there is a direct pull from the mill to the block just as in the case where the old hand blocking is employed. This permits ready access to the portion of the strip emerging from the rolls so that the attendant may gage the metal during the rolling operation, as customary.

The operation of forming the first convolution around the block is of course the matter of prime importance, for the rest of the operation takes place in substantially the customary manner. By my invention the strip is fed on the block in a very reliable manner, without stopping either the rolling mill or the block, and as no hand manipulation of the stock is necessary, all danger from that source is eliminated. The method employed is very simple, because the metal naturally commences to follow the circumference of the drum, which, owing to its large diameter, opens up the coil slightly against the spring action of the strip, thus causing the end of the strip to follow closely around the drum until it feeds under and is pinched by the second layer or wrapping. The coiling operation is then completed in the usual manner.

When it is again desired to coil the strip, without the use of the block, the power mechanism E is actuated to return the block to the inoperative position.

In Fig. 10 I have shown a modification of the apparatus in which the supporting roll 28 of the coiler is omitted, so that after the first convolution has been formed the strip will pull up in a straight line from the bite of the rolls 22, 23.

My improved apparatus may be characterized as a combined open coiler and blocker, for the reason that it is adapted to form an open coil, as shown in Fig. 1, or to wind the strip tightly on a block, as shown in Fig. 2. The combined open coiler and blocker is provided with a common means for bending the strip in both the open coiling and blocking operations.

It will be obvious that I do not limit myself to the coiling of metal in the form of sheets, because my apparatus can be used in connection with various kinds of machines which turn out stock in various forms. It will be apparent also that while the movability of the block into and out of operative position with respect to the coiler is an important feature in some aspects of the invention, it is not important in other aspects. In some cases the drum or block may be fixed relative to the device which gives the metal its bend or set to start it moving around the block. Moreover, the block need not always be located above the coiler, and the coiler need not necessarily be of the three-roll type.

Various changes in these and other respects may be adopted within the scope of the invention as defined in the claims.

I do not claim herein the method of forming the coil on the block, as the same forms the subject matter of my application Serial No. 857,767, filed August 20, 1914.

What I claim is:

1. In apparatus for blocking metal strips and the like, the combination of a coiler adapted to give the strip a curve or bend of definite radius, a rotary block, and means for laying the strip tightly on the block in a plurality of convolutions of successively increasing diameter; substantially as described.

2. In apparatus for blocking metal strips and the like, the combination of a coiler, means to drive the same, a block coöperating with the coiler, and means to drive the block at a higher speed than the coiler; substantially as described.

3. In blocking apparatus, the combination of devices for feeding the strip and giving it a bend or set tending to form it into a convolution of predetermined radius, a block of greater radius than such convolution adapted to coöperate with said devices in forming a tight coil on the block, and means to drive the block, substantially as described.

4. The combination with coiling rolls and means for feeding stock to said rolls, of a block coöperating with said rolls, and means for driving said block at a higher speed than said rolls; substantially as described.

5. The combination of a driven coiler adapted to give a positive coiling bend to a length of material, and a rotary block located in the line of feed of the bent material; substantially as described.

6. In blocking apparatus, the combination of a three-roll coiler, and means for engaging and blocking the strip as it is bent by and issues from said coiler; substantially as described.

7. In blocking apparatus, the combination of a three-roll coiler to curve the strip in a single plane, a block to receive the strip, and means to drive the block so as to lay thereon a plurality of convolutions of successively increasing diameter, said block being of greater diameter than the initial curve imparted to the strip by the coiler; substantially as described.

8. The combination of a coiler, means to drive the same, a block located in the line of feed of the metal bent by said coiler, and means to drive said block; substantially as described.

9. The combination with a rolling mill or like machine, of a coiler and block located laterally of said rolling mill so as to receive the metal issuing therefrom, said coiler and block being arranged in superposed relation so that the coiler lays the metal on the block, and means for shifting the block away from the coiler when the coil on the block has been started so as to obtain a straight pull from the mill to the block; substantially as described.

10. In metal coiling apparatus, the combination of means to feed the metal, means to curve the metal as it is fed, a block located within the curve of the metal, and means to drive the block at a greater surface speed than the normal feed of the metal.

11. In metal coiling apparatus, the combination of a coiler, and a rotary block movable into blocking coöperation with the coiler; substantially as described.

12. In metal coiling apparatus, the combination of a coiler, a rotary block, and power mechanism to move the block into a blocking position in which it receives the bent strip directly from the coiler; substantially as described.

13. In a combined open coiler and blocker, the combination of means for forming a plurality of coil convolutions in a single plane, and a block shiftable in said plane toward said coil-forming means; substantially as described.

14. In a metal coiling apparatus, a three-roll metal-strip coiler, and a rotary block located in the line of feed of said three-roll coiler and positioned to receive the metal strip after it passes through the coiler; substantially as described.

15. In metal coiling apparatus, the combination of a coiler and a rotary block, said coiler and block relatively movable to bring the block into the line of feed of the coiler; substantially as described.

16. In metal coiling apparatus, the combination of coiling rolls, means to drive the same, a rotary block movable relative to said coiling rolls, means for driving said block and power mechanism for shifting said block into blocking position with respect to said rolls; substantially as described.

17. The combination of a coiler adapted to give a positive coiling bend to a length of material, a rotary block, and means for producing relative movement of the parts so as to bring said block into the line of feed of the coiler; substantially as described.

18. In metal coiling apparatus, the combination of a three-roll coiler, a frame pivoted to swing over the coiler, a block carried by said frame, means for rotating said block to wind the material thereon as it leaves the coiler, and power mechanism for shifting said frame; substantially as described.

19. In metal coiling apparatus, the combination of means to feed the metal, means to curve the metal as it is fed, a block located within the curve of the metal and of greater radius than said initial curve, and means to drive the block at a greater surface speed than the normal feed of the metal; substantially as described.

20. In metal coiling apparatus, the combination of a coiler adapted to give the strip a curve of predetermined radius and to form a coil composed of overlapping convolutions of successively increasing diameter, a member formed and located to support the coil interiorly as it forms, and means for rotating said member while engaging the inner convolution of the coil, whereby the strip is laid on said member in a plurality of layers; substantially as described.

21. In metal coiling apparatus, the combination of a coiler adapted to give the strip a curve of predetermined radius, and to form a coil composed of overlapping convolutions, a member of greater radius than said first-named radius arranged to support the coil interiorly as it forms, and means for rotating said member while engaging the inner convolution of the coil, whereby the strip is laid on said member in a plurality of layers; substantially as described.

22. In metal coiling apparatus, the combination of a coiler adapted to give the strip a curve of predetermined radius and to form a coil composed of overlapping convolutions of successively increasing diameter, a block the radius of which is greater than said first-named radius, located within the curve of the metal and adapted to support the coil interiorly as it forms, and means for driving said block at a higher speed than the normal feed of the metal; substantially as described.

23. In an automatic blocker, the combination of a drum or block, means for rotating the same, means for feeding the strip toward the block, and means for curving the strip, before it reaches the block, on such a curve that the forward end of the strip strikes the block and moves around with the same.

24. The combination with a block, of a bending device for laying the strip on the block, said bending device constructed and arranged to operate independently of the block, and to form an open coil; substantially as described.

25. A combined open coiler and blocker, having a block, and a common means for bending the strip in both the open coiling operation and the blocking operation; substantially as described.

26. The combination of a coiler, a block mounted to swing toward the coiler about an axis eccentric to the block, and means for rotating the block when it occupies any of a number of different positions relative to such axis; substantially as described.

27. The combination of a block, a coiling device which engages its product with said block, and means for opening the coiling device to allow free passage of the material when so engaged; substantially as described.

28. In apparatus such as described, the combination of a metal strip coiler, and means in the line of feed of said coiler for engaging and blocking the strip which has passed through said coiler; substantially as described.

29. In apparatus such as described, the combination of coiling rolls, and a block in the line of feed of the strip bent by said coiling rolls adapted to engage and wind the strip as it issues from said rolls; substantially as described.

30. The combination of a coiler, and a block located in the line of feed of said coiler to coöperate therewith in blocking material, said block mounted to move toward and away from the coiler; substantially as described.

31. The combination with a rolling mill or the like, of a coiler to coil the strip issuing from the mill, and a member about which the strip is wound coöperative with the coiler for blocking the material bent thereby, said member mounted to swing away from the coiler to obtain a straight pull from the mill; substantially as described.

32. The combination with a block, of a bending device in whose line of feed said block is located, adapted to lay the material on said block, said bending device and block being relatively movable so that they can be separated from each other, and said bending device constructed and arranged to form an open coil when it is separated from said block; substantially as described.

In witness whereof, I have hereunto set my hand on the 18 day of August 1914.

WALTER R. CLARK.

Witnesses:
 CLIFFORD W. LOCKWOOD,
 WILLIAM B. WALLACE.